(12) United States Patent
Malley et al.

(10) Patent No.: US 7,949,972 B2
(45) Date of Patent: May 24, 2011

(54) METHOD, SYSTEM AND COMPUTER PROGRAM PRODUCT FOR EXPLOITING ORTHOGONAL CONTROL VECTORS IN TIMING DRIVEN SYNTHESIS

(75) Inventors: Edward T. Malley, New Rochelle, NY (US); Fadi Y. Busaba, Poughkeepsie, NY (US); David S. Hutton, Tallahassee, FL (US); Christopher A. Krygowski, Lagrangeville, NY (US); Jeffrey S. Plate, Poughkeepsie, NY (US); John G. Rell, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 511 days.

(21) Appl. No.: 12/051,268

(22) Filed: Mar. 19, 2008

(65) Prior Publication Data
US 2009/0241084 A1 Sep. 24, 2009

(51) Int. Cl.
*G06F 17/50* (2006.01)
(52) U.S. Cl. ....................................... 716/104
(58) Field of Classification Search .................... 716/18, 716/104
See application file for complete search history.

(56) References Cited

U.S. PATENT DOCUMENTS
7,275,224 B2 9/2007 Meaney et al.
7,290,240 B1 10/2007 Lam-Leventis et al.

OTHER PUBLICATIONS

Stok, L. et al., "Booledozer: Logic synthesis for ASICs", Feb. 6, 1996, pp. 1-68.*
Dave Allen, "Automatic one-hot-re-encoding for FPGAs", Field-Programmable Gate Arrays: Architecture and Tools for Rapid Prototyping, ISBN 978-3-540-57091-2, pp. 71-77.

* cited by examiner

*Primary Examiner* — Stacy A Whitmore
(74) *Attorney, Agent, or Firm* — Cantor Colburn LLP; John Campbell

(57) ABSTRACT

Systems, methods and computer program products for exploiting orthogonal control vectors in timing driven systems. An exemplary embodiment includes running an initial logic synthesis run on the system, identifying critical inputs to a logic cone related to the run, identifying orthogonal vectors in the logic cone, adding vectors to the logic cone, obtaining logical solutions and selecting a solution from the logical solutions.

20 Claims, 5 Drawing Sheets

METHOD, SYSTEM AND COMPUTER PROGRAM PRODUCT FOR EXPLOITING ORTHOGONAL CONTROL VECTORS IN TIMING DRIVEN SYNTHESIS

BACKGROUND OF THE INVENTION

This invention relates generally to control vectors in computer systems, and more particularly to providing exploitation of orthogonal control vectors in timing driven synthesis.

In modern, high frequency microprocessors, there are typically cycle limiting path(s). As such, the speed with which the logic on the given path can be executed determines the speed of the microprocessor. Therefore, fast execution of such a path yields a faster clock speed, which results in better performance.

If the path is in a custom dataflow macro, the circuit designer typically determines the design. In such circumstances, the designer executes the function implementing as few gates as possible. Since dataflow logic tends to be repetitive and straightforward, it is possible for the designer to generate the optimum solution. If the path is in a control macro, the task can be more complicated. Control logic tends to be more random than dataflow logic. As a result, timing driven synthesis tools are implemented to generate logic based on very high-speed integrated circuit (VHSIC) hardware description language (VHDL) written by a logic designer. The tool recognizes timing critical paths, based on timing assertions, and attempts to generate optimal logic on these paths in order to meet timing. Thus, in the case of a cycle limiting path in a control macro, the synthesis tool is the determining factor.

However, the solution generated by synthesis may not be the minimal solution. Frequently, the synthesis tool is unable to recognize cases that can never occur. Designing a chip with a non-minimal cycle limiting path is unacceptable. As such, the logic designer, in order to help synthesis along, must be able to help synthesis recognize and exploit the quirks of the controls, which allows synthesis to regenerate a more optimal solution.

BRIEF SUMMARY OF THE INVENTION

An exemplary embodiment includes a computer program product for exploiting control vector orthogonality to generate new gate structures in a computer system having a processor with cycle-limiting paths, the computer program product including a tangible storage medium readable by a processing circuit and storing instructions for execution by the processing circuit for performing a method including running an initial logic synthesis run on the system, identifying critical inputs to a logic cone related to the run, identifying orthogonal vectors in the logic cone, adding vectors to the logic cone, obtaining logical solutions and selecting a solution from the logical solutions.

Another exemplary embodiment includes a system for exploiting control vector orthogonality to generate new gate structures, the system including a processor with cycle-limiting paths, a logic synthesis tool residing on the processor, the logic synthesis tool performing running an initial logic synthesis run on the system, identifying critical inputs to a logic cone related to the run, identifying orthogonal vectors in the logic cone, adding vectors to the logic cone, obtaining logical solutions and selecting a solution from the logical solutions.

A further exemplary embodiment includes a method for exploiting control vector orthogonality to generate new gate structures in a processor, the method including running an initial logic synthesis run related to paths in the processor, identifying critical inputs to a logic cone related to the run, identifying orthogonal vectors in the logic cone, adding vectors to the logic cone, obtaining logical solutions and selecting a solution from the logical solutions.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

In an exemplary embodiment, the systems and methods described herein attain concise solutions to the above-described problems, in the case of an orthogonal control vector, that is, a vector of N bits where one and only one of those N bits are on at a given time. In an exemplary embodiment, an attribute added to the VHDL directs synthesis to exploit the orthogonal properties of the vector and therefore generate a different gate structure. The new structure contains less logic on the critical path, and yields an improved cycle time for the machine.

Figure 1:
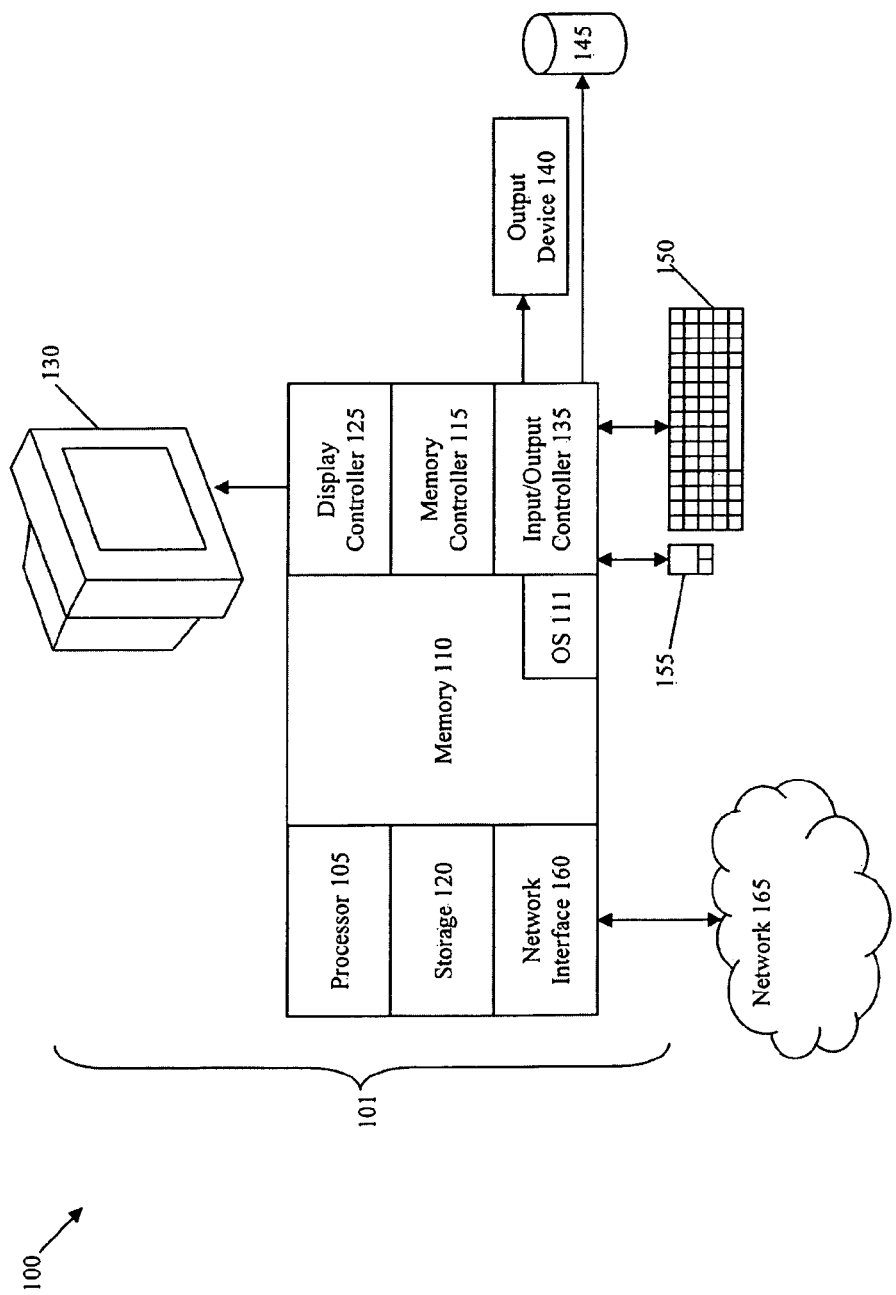
FIG. 1 illustrates an exemplary embodiment of a system for exploiting control vector orthogonality to generate new gate structures.

FIG. 1 illustrates an exemplary embodiment of a system 100 for exploiting control vector orthogonality to generate new gate structures. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the orthogonal control vector exploitation methods described herein in accordance with exemplary embodiments and a suitable operating system (OS) 111. The operating system 111 essentially controls the execution of other computer programs, such the orthogonal control vector exploitation systems and methods described herein, and provides scheduling, input-output control, file and data management, memory management, and communication control and related services.

The orthogonal control vector exploitation methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the orthogonal control vector exploitation methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The orthogonal control vector exploitation methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The orthogonal control vector exploitation methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the orthogonal control vector exploitation methods are implemented in hardware, the orthogonal control vector exploitation methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
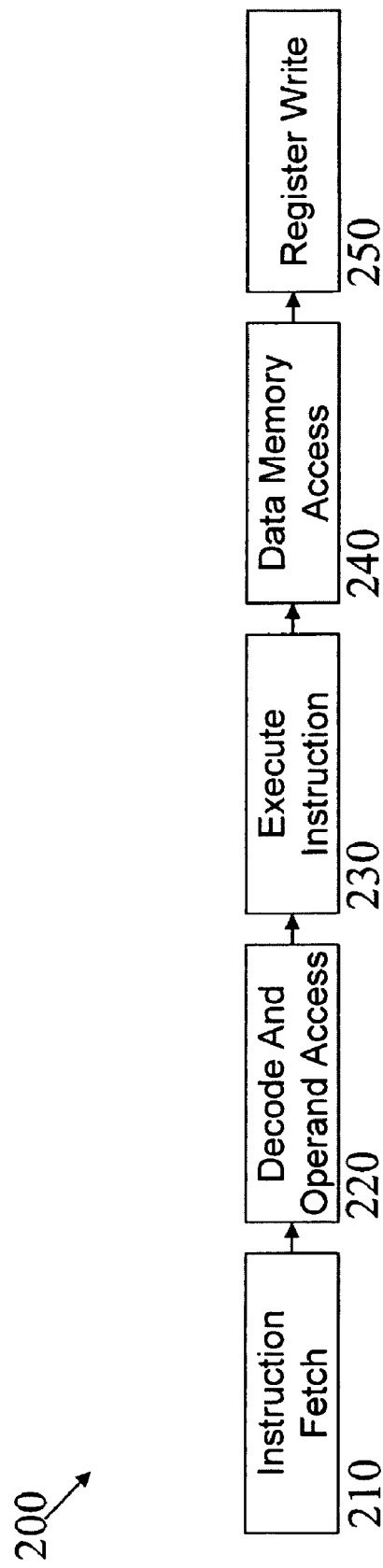
FIG. 2 illustrates a block diagram of a processor instruction pipeline system coupled to the processor in which the exemplary orthogonal control vector exploitation methods can be implemented in accordance with an exemplary embodiment.

FIG. 2 illustrates a block diagram of a processor instruction pipeline system 200 coupled to the processor 105 in which the exemplary orthogonal control vector exploitation methods can be implemented in accordance with an exemplary embodiment. Pipelining is one specific form of parallelism, where the execution of several instructions can be interleaved on the same hardware. In an exemplary embodiment, the pipeline system includes five stages: (1) Instruction fetch 210; (2) Decode and operand access 220; (3) Execute instruction 230; (4) Data memory access 240; and (5) Register write 250. In an exemplary embodiment, the instruction fetch 210 stage fetches instructions to be processed. The Decode and operand access 220 stage decodes the instruction and gathers the source operands needed by the instruction being processed. The Execute instruction 230 stage performs the function of the instructions that can include arithmetic logic unit (ALU) operations. In an exemplary embodiment, the data memory access 240 stage performs any data memory access functions associated with the instruction. The Write Register write 250 stage writes the appropriate result value into the register file.

For illustrative purposes, a cycle limiting path for an IBM zSeries is discussed. More specifically, for purposes of discussion the CC (condition code) to branch wrong path is described. It is understood that other cycle limiting paths and other processor are contemplated in other exemplary embodiments.

Execution of a branch type instruction, like any other instruction, begins when the instruction is fetched from the I-cache (instruction cache) associated with the processor 105 and the pipeline 200. When the IFU (instruction fetch unit) in the processor 105 sees that a branch has been encountered, for performance reasons, the outcome of the branch (taken or not taken) is predicted by the IFU, which allows the processor 105 to continue executing on the predicted branch path without waiting for the branch to be resolved later in the pipeline 200. Once the branch reaches the FXU (fixed point unit), a branch wrong must be calculated. In other words, if the branch was predicted correctly, no branch wrong is broadcast and the processor 105 can continue executing. However, it is possible that the branch was predicted incorrectly. In that case, the FXU must indicate the mis-prediction, and the processor 105 must recover from the mis-predicted branch. Maximizing performance requires that the branch wrong penalty be minimized. As a result, the branch wrong must be calculated as soon as possible.

The majority of the branches that are executed are based on the processor's condition code (CC). A CC of CC0, CC1, CC2, or CC3 is set after the execution of many ops in the z architecture. The execution result determines which CC is set. For example, the result of a signed add instruction yields the following possible CC settings: CC0—result of add was 0; CC1—result of add yields a negative number; CC2—result of add yields a positive number; and, CC3—result of add causes an overflow Naturally, Determining the above information requires that the instruction has completed execution. Therefore, the earliest that the CC can be calculated is during the cycle immediately following execution.

The branch wrong during can be efficiently determined during the same cycle that the CC has been generated, thus minimizing the branch wrong penalty. However, in performing determining the branch wrong during the same cycle that the CC is generated implements a large amount of logic that is inserted into the CC to branch wrong cycle, thus creating a cycle limiting path.

In an exemplary embodiment, a branch on condition (BC) instruction is dispatched with a four-bit mask value. Each bit of the CC is compared to the corresponding bit of that mask value. If the mask bit that corresponds to the current condition code is a logical 1, which means that the branch is taken. If the mask bit is a logical 0, that means that the branch is not taken.

Figure 3:
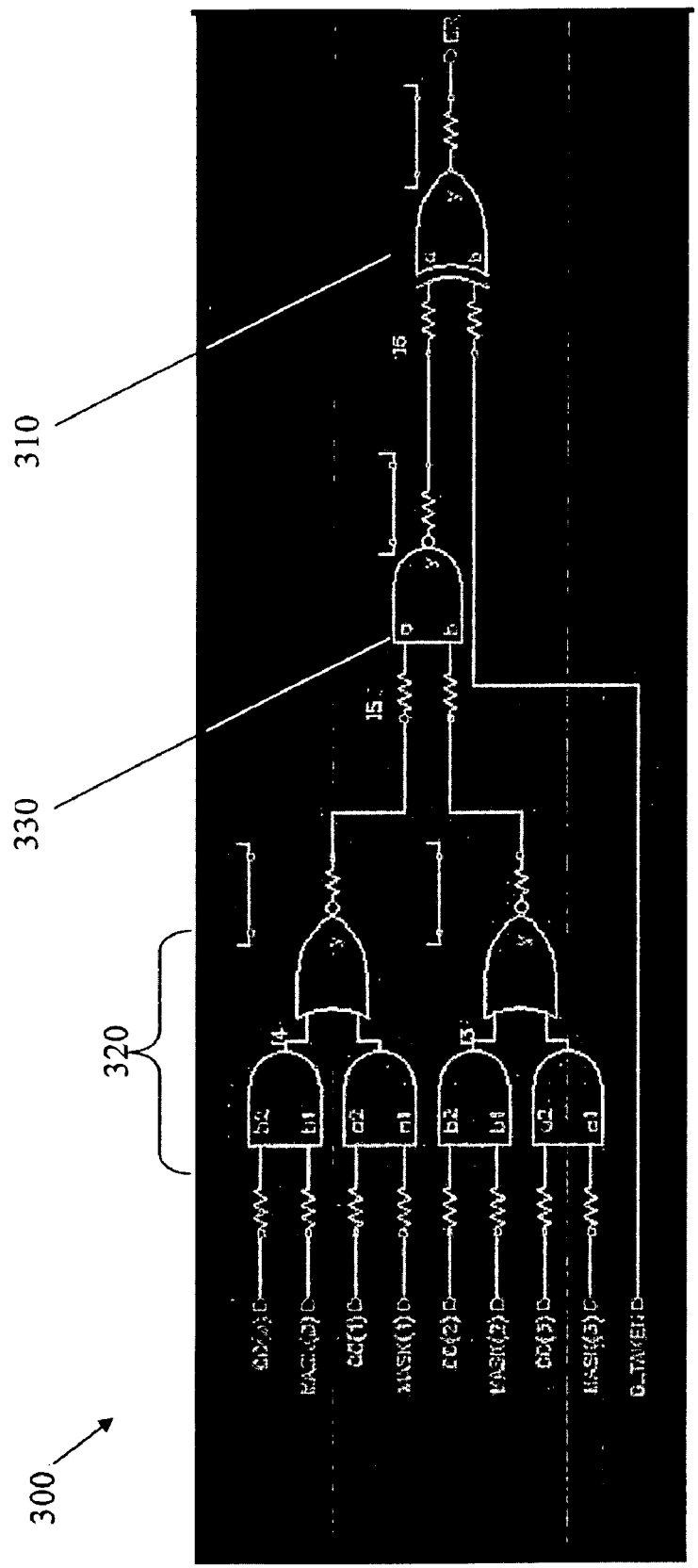
FIG. 3 illustrates a schematic diagram of an initial solution generated in accordance with an exemplary embodiment.

FIG. 3 illustrates a schematic diagram 300 of an initial solution generated in accordance with an exemplary embodiment. A CC that is valid for a given BC instruction causes that mask bit to propagate to the 'a' input of the XOR gate 310. If a mask bit of 1 propagates to the XOR 310, and the branch was guessed taken (G_TAKEN=1), the XOR 310 yields a 0, indicating that the branch was predicted correctly. If a mask bit of 0 propagates to the XOR 310, and the branch was guessed taken, the XOR 310 yields a 1, indicating the mis-predicted branch. If a mask bit of 1 propagates to the XOR 310 and the branch was guessed not taken (G_TAKEN=0), the XOR 310 yields a 1, indicating the mis-predicted branch. Finally, if a mask bit of 0 propagates to the XOR 310 and the branch was guessed not taken, the XOR 310 yields a 0, indicating that the branch was predicted correctly.

The cycle limiting path in FIG. 3 begins with the CC (0:3) pins and ends at the BR_WRONG pin as indicated by an initial logic synthesis that yields poor timing on the vector in question. So, to complete this logic, the shortest critical path that synthesis was able to generate must execute an AOI22 320, a NAND2 330, and the XOR 310. The MASK(0:3) and G_TAKEN pins both come from latched inputs, meaning that the timing on these paths is non-critical, as indicated by the initial logic synthesis showing high slack on the paths in question.

In exemplary embodiments, the orthogonal nature of the CC, indicated by an attribute can direct synthesis to exploit a different solution, thus minimizing the cycle time of this path by removing the XOR and executing it elsewhere as discussed further herein.

Figure 4:
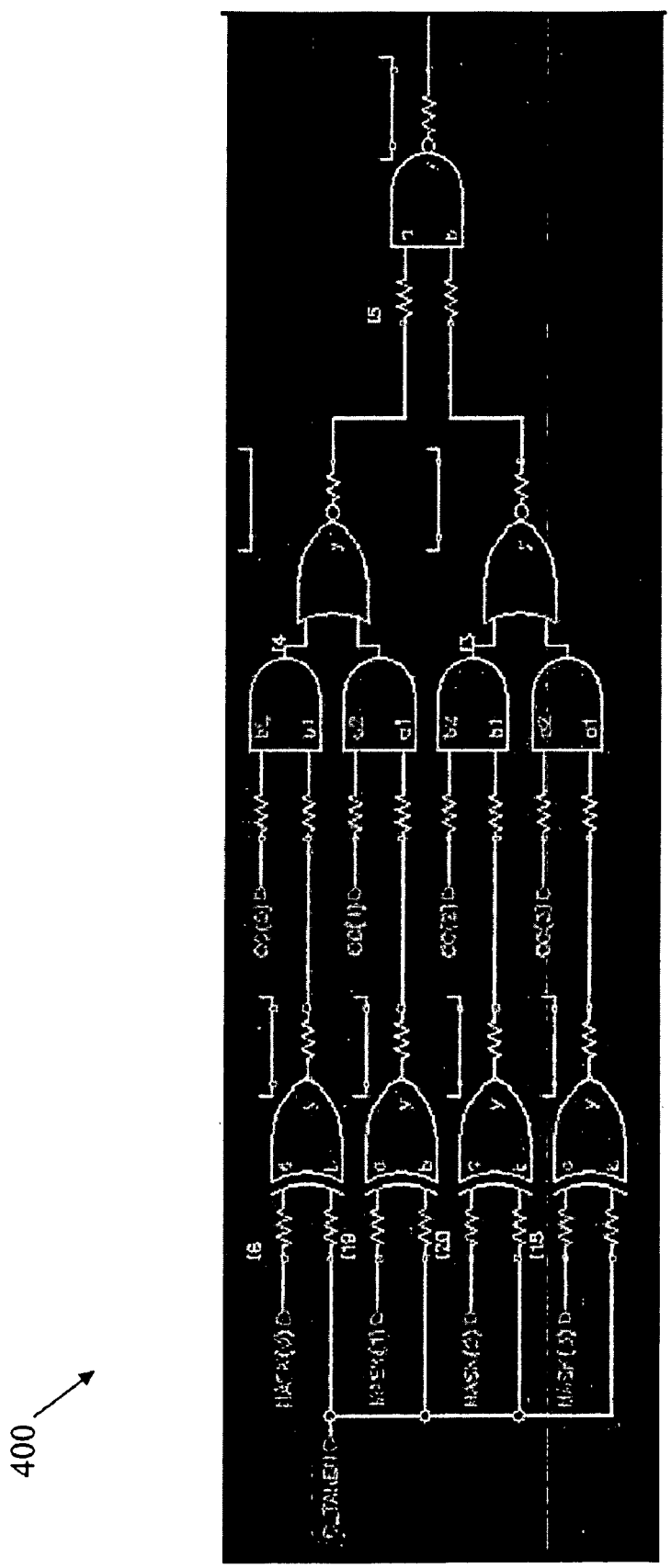
FIG. 4 illustrates a schematic diagram of an alternate solution generated in accordance with an exemplary embodiment.

FIG. 4 illustrates a schematic diagram 400 of an alternate solution generated in accordance with an exemplary embodiment. In an exemplary embodiment, the XOR is positioned onto the non-critical MASK/G_TAKEN path. The value of the CC propagates the XOR of the corresponding MASK bit and the G_TAKEN bit to the BR_WRONG output. If the MASK is a 1, and G_TAKEN is 1, a 0 propagates to the BR_WRONG output, indicating that the branch was predicted correctly. If the MASK is a 0, and G_TAKEN is a 1, a 1 propagates to the BR_WRONG output, indicating that the branch was predicted incorrectly. If the MASK is a 1, and G_TAKEN is a 0, a 1 propagates to the BR_WRONG output, indicating that the branch was predicted incorrectly. If the MASK is a 0, and G_TAKEN is a 0, a 0 propagates to the BR_WRONG output, indicating that the branch was predicted correctly.

Synthesis is initially unable to generate this solution because the two designs above are not logically equivalent for all input options. In exemplary embodiments, logic synthesis solves for all possible input combinations. As such, in exemplary embodiments, the user enters data related to the orthogonal vector. However, synthesis can generate the second design knowing the orthogonality of the CC. The following equations illustrate the logic of the solutions. The initial solution of FIG. 3 yields the following logical equation: [(CC0)(MSK0)+(CC1)(MSK1)+(CC2)(MSK2)+(CC3)(MSK3)] XOR (G_TAKEN)=BR_WRONG. Under the assumption that the CC is orthogonal, all but one of the CC/MSK terms drop out, yielding the following equation: MSKx) XOR (G_TAKEN)=BR_WRONG, where x is the value of the current CC (0, 1, 2 or 3) that is a 1. The minimal solution yields the following logical equation: [(MSK0 XOR G_TAKEN)(CC0)]+[(MSK1 XOR G_TAKEN)(CC1)]+ [(MSK2 XOR G_TAKEN)(CC2)]+[(MSK3 XOR G_TAKEN)(CC3)]=BR_WRONG. Under the assumption that the CC is orthogonal, all but one of the terms drop out, yielding the following equation: (MSKx) XOR (G_TAKEN)=BR_WRONG, where x is the value of the current CC (0, 1, 2 or 3) that is a 1. It is thus appreciated that for the orthogonal CC, the two structures are logically equivalent, as further described herein. As such, the new cycle limiting path (from CC(0:3) to BR_WRONG) includes only an AOI22 and a NAND2. In exemplary embodiments, the XOR gate has been removed from the original path, resulting in a faster critical path (as compared in FIGS. 3 and 4). By exploiting the orthogonality of the CC and restructuring the logic accordingly, the amount of logic on the path is minimized, allowing a faster cycle time on the processor 105.

Figure 5:
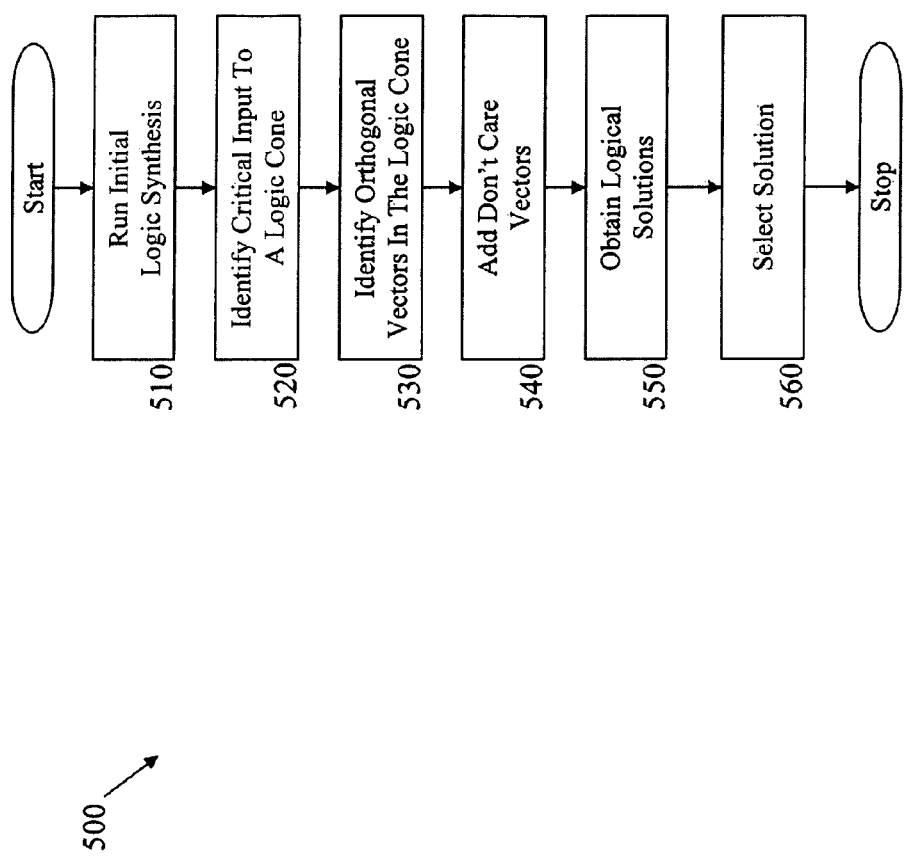
FIG. 5 illustrates a flow chart of a method for exploiting control vector orthogonality to generate new gate structures in accordance with an exemplary embodiment.

FIG. 5 illustrates a flow chart of a method 500 for exploiting control vector orthogonality to generate new gate structures. At block 510, the user runs an initial logic synthesis on the system 100. At block 520, the user identifies critical inputs to a logic cone. At block 530, the user further identifies orthogonal vectors in a critical logic cone. At block 549, the logic synthesis tool can add (2^N)−N don't care vectors to the logic cone where N is the number of bits in the orthogonal vector. At block 550, the logic synthesis algorithm executes multiple iterations of Boolean expansions/compressions, yielding multiple logical solutions. At block 560, the logic synthesis chooses a solution that requires the fewest combinational logic levels on the previously identified critical path.

Technical effects and benefits include the ability to exploit orthogonal control vectors in timing systems to adjust initial logic synthesis runs having a critical path to generate a logic solution that requires the fewest combinational logic levels on a previously identified critical path.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A computer program product for exploiting control vector orthogonality to generate new gate structures in a computer system having a processor with cycle-limiting paths, the computer program product comprising:
a tangible non-transitory storage medium readable by a processing circuit and storing instructions for execution by the processing circuit for performing a method comprising:
running an initial logic synthesis run on the system;
identifying critical inputs to a logic cone related to the run;
identifying orthogonal vectors in the logic cone;
adding vectors to the logic cone;
obtaining logical solutions to the initial logic synthesis run on the system; and
selecting a solution from the logical solutions.

2. The computer program product as claimed in claim 1 wherein the added vectors are don't care vectors.

3. The computer program product as claimed in claim 1 wherein the added vectors are (2^N)−N don't care vectors, where N is the number of bits in the orthogonal vector.

4. The computer program product as claimed in claim 1 wherein obtaining logical solutions to the initial logic synthesis run on the system comprises executing multiple iterations of Boolean expansions/compressions.

5. The computer program product as claimed in claim 1 wherein obtaining logical solutions to the initial logic synthesis run on the system comprises running additional logic synthesis paths via data related to the orthogonal vectors.

6. The computer program product as claimed in claim 1 wherein the selected solution requires a smallest number of logic levels to complete a critical path.

7. The computer program product as claimed in claim 6 wherein the critical path is compared to the previously identified critical path from the initial logic synthesis run.

8. A system for exploiting control vector orthogonality to generate new gate structures, the system comprising:
a processor with cycle-limiting paths;
a logic synthesis tool residing on the processor, the logic synthesis tool configured to perform a method comprising:
running an initial logic synthesis run on the system;
identifying critical inputs to a logic cone related to the run;
identifying orthogonal vectors in the logic cone;
adding vectors to the logic cone;
obtaining logical solutions to the initial logic synthesis run on the system; and
selecting a solution from the logical solutions.

9. The system as claimed in claim 8 wherein the added vectors are don't care vectors.

10. The system as claimed in claim 8 wherein the added vectors are (2^N)−N don't care vectors, where N is the number of bits in the orthogonal vector.

11. The system as claimed in claim 8 wherein obtaining logical solutions to the initial logic synthesis run on the system comprises executing multiple iterations of Boolean expansions/compressions.

12. The system as claimed in claim 8 wherein obtaining logical solutions to the initial logic synthesis run on the system comprises running additional logic synthesis paths via data related to the orthogonal vectors.

13. The system as claimed in claim 8 wherein the selected solution requires a smallest number of logic levels to complete a critical path.

14. The system as claimed in claim 13 wherein the critical path is compared to the previously identified critical path from the initial logic synthesis run.

15. A computer-implemented method for exploiting control vector orthogonality to generate new gate structures in a processor, the computer-implemented method comprising:
   running, in a computer, an initial logic synthesis run related to paths in the processor;
   identifying critical inputs to a logic cone related to the run;
   identifying orthogonal vectors in the logic cone;
   adding vectors to the logic cone;
   obtaining logical solutions to the initial logic synthesis run related to paths in the processor; and
   selecting a solution from the logical solutions.

16. The computer-implemented method as claimed in claim 15 wherein the added vectors are don't care vectors.

17. The computer-implemented method as claimed in claim 15 wherein the added vectors are (2^N)–N don't care vectors, where N is the number of bits in the orthogonal vector.

18. The computer-implemented method as claimed in claim 15 wherein obtaining logical solutions to the initial logic synthesis run related to paths in the processor comprises executing multiple iterations of Boolean expansions/compressions.

19. The computer-implemented method as claimed in claim 15 wherein obtaining logical solutions to the initial logic synthesis run related to paths in the processor comprises running additional logic synthesis paths via data related to the orthogonal vectors.

20. The computer-implemented method as claimed in claim 15 wherein the selected solution requires a smallest number of logic levels to complete a critical path as compared to the previously identified critical path from the initial logic synthesis run.

* * * * *